May 13, 1969  A. E. MOORE  3,443,776
RINGPLANE
Original Filed Aug. 17, 1964  Sheet 1 of 5

ALVIN EDWARD MOORE,
INVENTOR.

BY Alvin E. Moore
ATTORNEY

May 13, 1969     A. E. MOORE     3,443,776
RINGPLANE
Original Filed Aug. 17, 1964     Sheet _2_ of 5
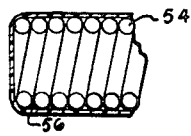
FIG. 6
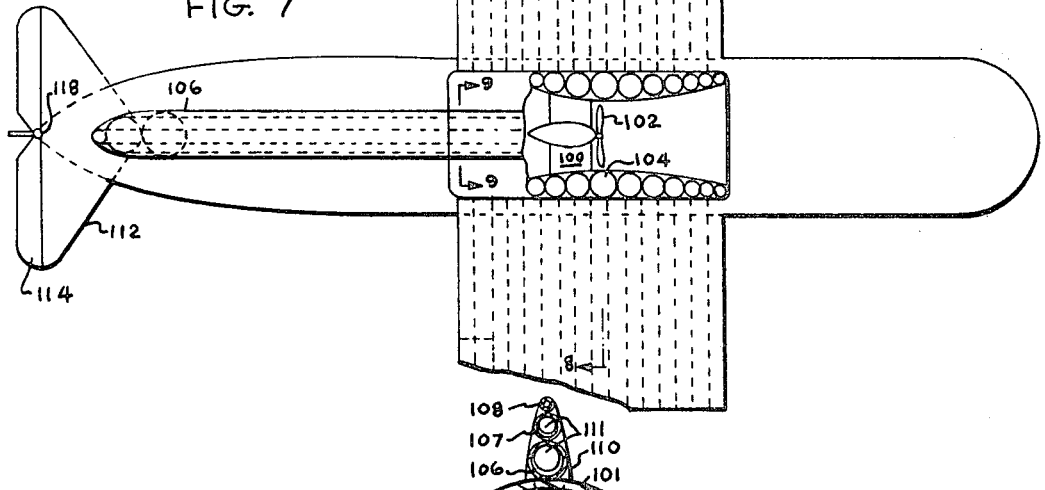
FIG. 7
FIG. 8
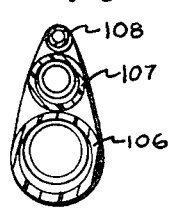
FIG. 9
ALVIN EDWARD MOORE,
INVENTOR.
BY *Alvin E. Moore*
ATTORNEY.
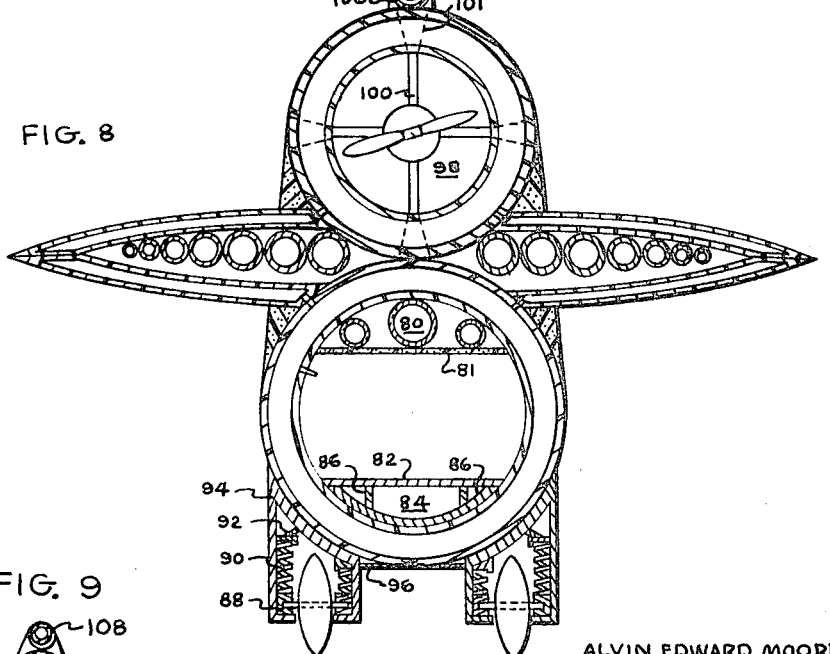

ALVIN EDWARD MOORE,
INVENTOR.

BY
*Alvin E. Moore*
ATTORNEY.

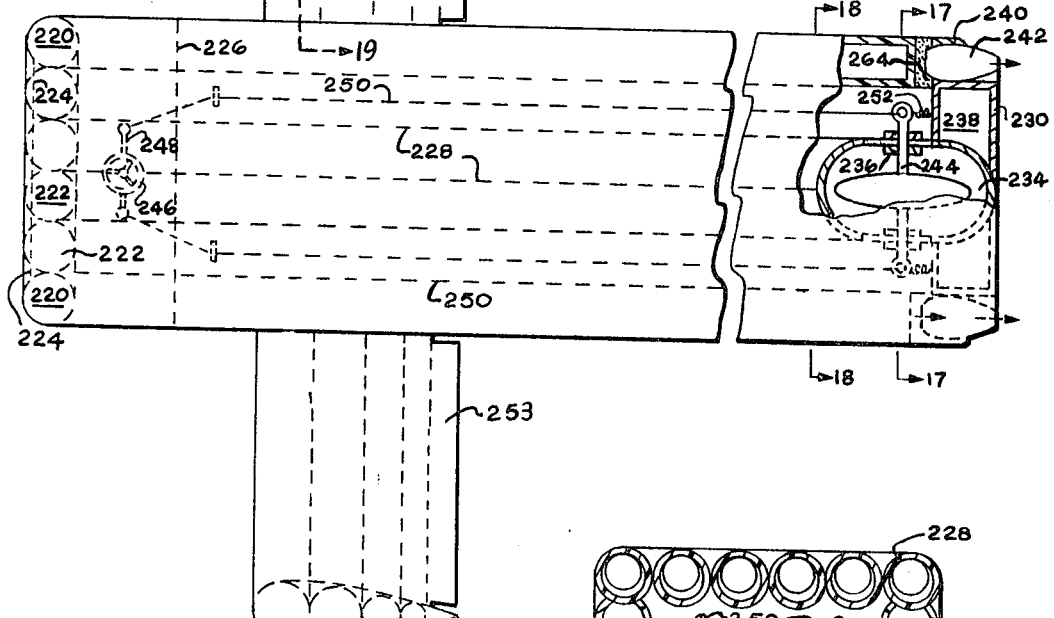
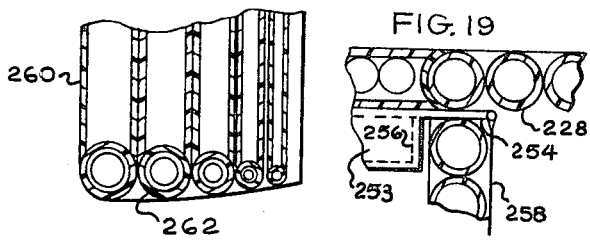
ALVIN EDWARD MOORE,
INVENTOR.

United States Patent Office

3,443,776
Patented May 13, 1969

3,443,776
RINGPLANE
Alvin E. Moore, 916 Beach Blvd.,
Waveland, Miss. 39576
Continuation of abandoned application Ser. No. 389,973,
Aug. 17, 1964. This application May 4, 1966, Ser. No.
547,674
Int. Cl. B64c 1/34, 17/00
U.S. Cl. 244—5                                    73 Claims

ABSTRACT OF THE DISCLOSURE

A light-weight, slightly heavier-than-air vehicle (such as an airplane or hovercraft), having fluid-dynamic (aerodynamic) and aerostatic lifting forces, and adapted to yield under major shocks without fracture of any of its parts. Resilient buffering means, comprising inflated flexible tubes, extends entirely around the load-carrying cabin space. In these tubes lighter-than-air units (such as elements 7 of FIGURE 1), containing helium, hydrogen or the like, may be housed, within more economically obtained heavier-than-helium gas. Other disclosed means for obtaining aerostatic lift are: containers of lighter-than-air gas inside the cabin (such as elements 136 of FIGURE 10); balloon-like members on top of the fuselage (such as elements 16 and 20 of FIGURE 1); and containers of helium or the like imbedded in plastic (such as elements 214 of FIGURE 13). Both the cabin and the wings comprise inflated tubes of flexible, non-stretchable material; such as fabric impregnated and permeated with rubber or plastic. The invention also includes: tubular wing-bracing means providing aerostatic lift; and a means for trimming the craft, comprising a plurality of liquid-storing tanks on each side of the longitudinal axis (such as elements 52 of FIGURES 1 and 4 or containers 140 and 142 of FIGURE 10). These tanks serve also as inner means to stiffen the deck part of the cabin, while the flexible-tube buffering means below and to the sides of the cabin may still yield, to counteract the damaging tendencies of major shocks.

---

This application is a continuation of copending application Ser. No. 389,973, filed Aug. 17, 1964, now abandoned.

This invention pertains to an inflated-tube aircraft. More particularly, it relates to an airplane whose structural elements comprise flexible tubes that are inflated with compressed air or other gas and that house hollow-space-containing lighter-than-air units that are free to move, without breaking, within the tubes.

In recent years a fateful problem in aviation has arisen. Airplanes made of aluminum-alloy parts frequently have crashed, usually shortly after takeoff or before landing, with great loss of life and property. Often overcasts, fogs or clouds are present in these disasters; and for some reason the crafts apparently are subjected to extreme vibrations, and are disintegrated. Irrespective of the basic cause of these sudden strong vibrations, the fact remains that metallic alloys in aircraft structures have not been able to stay intact under greatly multiplied strong oscillations.

This situation has intensified the necessity of a solution of the still unsolved greatest problem in aircraft construction: the production of a safe and economical aircraft—and especially such a vehicle which will be used by the average man. It should be very light in weight yet quite strong and durable, and able to takeoff and land in a short space. The helicopter as it has evolved to date is not the correct answer, for it is expensive, heavy, and frequently crashes due to failure of its complicated parts.

The so-called "light-weight" airplanes also have found little success in the mass-market, for in reality they are still fairly heavy, require too much length of airfield for takeoff and landing, and frequently are wrecked. Their light-weight material, usually aluminum alloy, is inherently not very strong under long-repeated vibration. Although the flexible rubber-and-fabric balloon, filled with helium, has a fairly good record for safety—especially in good weather—it is too bulky and hard to control, loses too much helium, and requires too expensive mooring facilities and labor to become the average man's aircraft.

A solution of the problem appears to lie in a combination of the better features of the heavier-than-air and lighter-than-air craft. Strength and flexibility, like that of the common automobile tire, are best achieved by building most of the craft of assembled inflated rubber-and-fabric tubes; and lightness may be obtained by housing within the tubes light-weight, dense-walled globes or cylinders that hold lighter-than-air gas or vacuums.

In view of the above facts, an object of the present invention is to provide an aerial vehicle that has a lighter-than-air lifting power, has a total weight that is a little heavier than air, and yet is very strong.

Another object of the invention is to produce a strong, durable, light-weight aircraft whose main structural elements are of a resilient nature which permits a multitude of flexures without breaking.

A further object is to provide an aircraft built of curved and/or straight flexible tubes that are fastened together, are inflated with compressed air or other readily and economically obtained gas, and house containers, of thin but dense material in their walls, which hold a lighter-than-air gas.

A further purpose is to provide a strong, light-weight vehicular structure comprising: an outer skin means; within the skin means, gas-cell-containing plastic; and within the plastic sealed receptacles containing pressurized gas.

Another object is to produce an aircraft of curved and/or straight flexible tubes that are fastened together, are inflated with compressed air or other readily obtained gas, and house hollow vessels that have thin walls of dense, hard material and contain vacuums.

A further object is to build an aircraft of straight and/or curved tubes of rubber-and-fabric, inflated with compressed air, and housing hollow containers of lighter-than-air gas or vacuums, said containers being supported for easy movement within the compressed air, and having thin walls, substantially impermeable to gas, of metal, glass or dense plastic.

The foregoing and other objects of the invention will become more fully apparent from the following detailed description of several forms of the invention and from the accompanying drawings. For ease and clarity of illustration, the showing of the inflated tubes in these drawings is hatched to indicate synthetic rubber or similar plastic; but in practice the plastic of these tubes preferably is reinforced with nylon or other fabric.

FIGURE 6 is a detail view in section, indicating an alternative method of making the fuselage or the fuel tanks.

FIGURE 7 is a plan view of the second form of the invention, with part of a wing tip shown as broken away, and part of the structure in section.

FIGURE 8 is a sectional view, on an enlarged scale, from the plane 8—8 of FIGURE 7.

FIGURE 9 is an enlarged detail view, in section from the plane 9—9 of FIGURE 7, of the stabilizing-fin tubes.

FIGURE 15 is a plan view, partly in section, of the fifth form of the invention.

FIGURE 16 is a detail view in horizontal section thru the lower wing and its junction with the vertical tubes that connect the biplane wings of the form of FIGURE 15, with the inner skin not yet attached to these tubes.

FIGURE 17 is a detail view in vertical section, from the plane 17—17 of FIGURE 15, of a portion of the tail-wheel axle and one of its bearings.

FIGURE 18 is a view, looking aft in section from the plane 18—18 of FIGURE 15.

FIGURE 19 is a detail, sectional view from the plane 19—19 of FIGURE 15.

In the herein disclosed forms of the basic invention nearly all the structural elements comprise straight, annular or otherwise curved inflated tubes. They are preferably of synthetic rubber and fabric, and may be made in a manner similar to the manufacture of rubber hose or of rubber tires of the type that are circular in cross section. But they are different from such articles in that they preferably have only one layer of rubber (or other flexible plastic), surrounded by and bonded to a single outer layer of fabric. A preferred method of making them is to force rubber extrusions downward from the pressure barrel of an extruder and into a fabric tube of the proper cross-sectional area to fit over the extruded rubber tube. After removing the composite tube thus formed from the tubing machine the inner space of the tubular element is nearly filled with thin-walled containers of lighter-than-air gas or, optionally, of vacuums. Then the ends of the tube are abutted and rubber-cemented or otherwise bonded together, if it is to be annular—or, if it is to be straight or non-circularly curved, each of its ends is closed by a piece of sheet rubber, bonded with fabric that is securely fastened to the fabric of the hollow tube. Then the tubular element is inflated with air at a sufficient pressure to force the soft rubber compound into the interstices of the fabric, so that the rubber and fabric are strongly unified.

Figure 1:
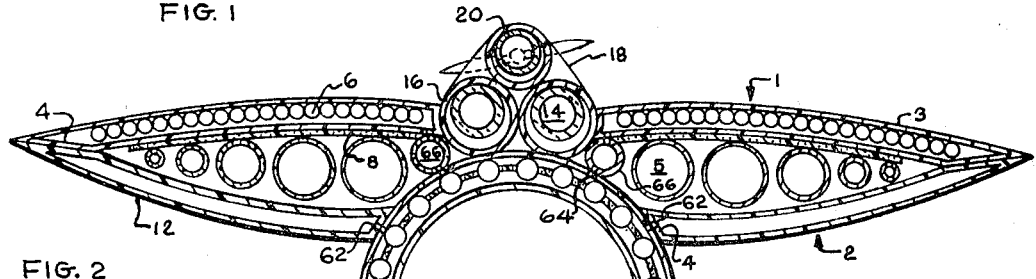
FIGURE 1 is an elevational, transversely sectional view of one form of the aircraft of the invention.
Figure 5:
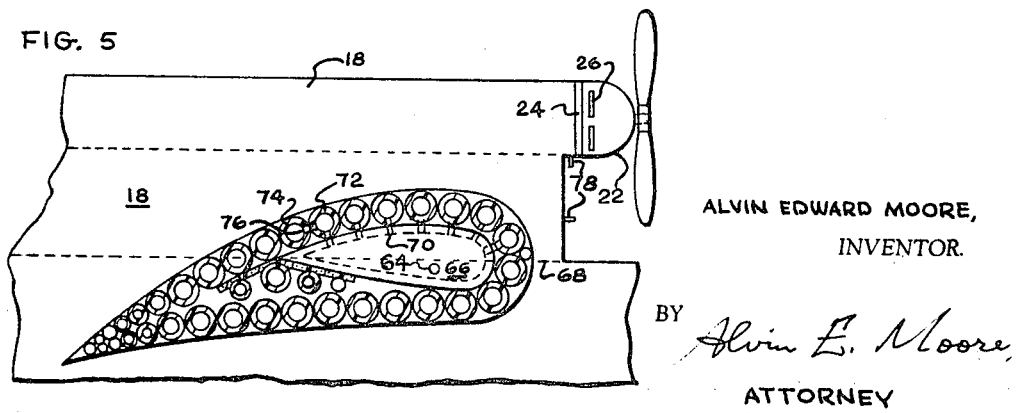
FIGURE 5 is a side elevational view of a forward portion of the airplane, showing one of its wings in transverse section.

In FIGURES 1 and 5 the wings are shown to comprise inflated, slightly arched upper tubular elements 1 and lower tubular elements 2. Each of these tubes, bonded and reinforced with fabric, is preferably made in the manner set forth above from a hollow extrusion of synthetic or natural rubber, a fabric envelope and rubber-and-fabric closure disks 4. The dies of the extruder are curved to provide the slight curvature of the tubes. The hollow elements are nearly filled with lighter-than-air units comprising thin-walled hollow spheres or closed cylinders of a dense, light-weight material that contain lighter-than-air gas or vacuums. Optionally, each tube may be made by the following method: (1) wrapping a sheet of bonded fabric and uncured rubber snugly around an aligned group of the light-than-air units; (2) bonding the rubber's joined, freshly cut edges together by touching them with naphtha, benzol or other rubber solvent; (3) with naphtha or the like, bonding rubber-and-fabric disks to the ends of the tube; (4) placing the resulting tube in an hermetically sealed hollow mold of the shape and size of the desired wing tube; (5) inflating the tube, thus expanding its rubber compound away from the lighter-than-air units; and (6) vulcanizing the rubber in an autoclave or by cold vulcanization. If desired, the fabric sheet referred to above in step (1) may be wrapped around the rubber compound after it is bonded into a tube in step (2). The process thus would involve six steps instead of five.

When light-weight gas is used in the lighter-than-air units it is preferably helium, hydrogen, or a mixture of hydrogen diffused with a small percentage of inert or non-combustible gas, such as neon, ammonia, carbon dioxide, nitrogen or argon. Because of the cost of the lighter-than-air gas (and in the case of hydrogen its explosiveness at high temperatures) the material of the container of the lighter-than-air units is preferably so dense as to be substantially impermeable to gas. It may be of a very thin metal, such as aluminum, magnesium, iron (preferably pure iron), titanium, or an alloy of any of these metals. Any of the following alloys may be used:

(1) Magnalium, an alloy of aluminum, which ordinarily has 70 to 90 percent of aluminum and 10 to 30 percent of magnesium. It has a specific gravity of about 2 to 2.5, is easily cast, does not readily fracture, and has a tensile strength greater than bronze or brass and over three times as great as aluminum. As the percentage of magnesium is increased above 30 percent magnalium becomes harder and somewhat brittle. Therefore, if the helium or hydrogen or mixture of hydrogen and non-combustible gas is put into a thin-walled container of this alloy under pressure greater than that of the atmosphere the percentage of magnesium should be no more than 30 percent. In other words, the commonly known magnalium would be utilized. But if the lighter-than-air gas is put in the container at a pressure at or lower than the atmospheric pressure the percentage of magnesium is increased to forty to sixty. This is because the extra hardness increases the strength of the curved container walls of the sphere or round-ended cylinder under compression—compression from the pressurized air in the rubber-and-fabric envelope and from sudden shocks to that envelope and its compressed air. This harder form of magnesium-aluminum alloy is therefore a good alloy in the lighter-than-air units.

(2) Ferro-aluminum, a very hard and brittle alloy made directly in electric furnaces that are used in obtaining aluminum from its oxides. Because of its hardness it will withstand considerable compression.

(3) Nickel-aluminum, often used in bell casting, which has a tensile strength of nearly twice that of aluminum and a specific gravity of 2.8, only a little more than the 2.70 of aluminum.

(4) An alloy consisting of 900 parts of aluminum, 50 parts of bismuth, 25 parts of iron, and 25 parts of nickel; it is light in weight, easily fused and soldered, and not readily attacked by oxidizing agents.

(5) Aluminum-nickel-titanium, an alloy which, for example, may consist of 97.6 percent aluminum, 2 percent nickel, and 0.4 percent titanium. This composition may be varied up to 3.5 percent of nickel and 2 percent of titanium; and up to this limit the titanium and nickel prevent the formation of flaws in the cast alloy. This alloy is thus a good material for the lighter-than-air units that are centrifugally cast in molds that contain helium or other lighter-than-air gas.

(6) Duralumin.

Optionally, and as shown in FIGURE 1 at 5, the containers may be made of thin glass. Glass has many advantages in this invention. It is impermeable to gas and very light in weight, having a specific gravity that is a little less than that of aluminum. It is not strong in tension, but, because there are numerous spherical or cylindrical containers in each rubber and fabric envelope, when the envelope momentarily yields under pressure its deformation does not cause any damage to the freely movable containers, which are floatingly supported within the gas-inflated envelope. Glass is unusually strong in compression; and, especially in a hollow globe or round-ended cylinder, it easily resists any temporary increase of pressure of the compressed air, due to flexing of the inflated envelope. This increase quickly diminishes in equalization of pressure throughout the tube, which presses equally on all parts of the sphere or round-ended cylinder—toward its center from an arch. In consequence, the wall of a container of glass thus floatingly supported within compressed air or other gas may be quite thin, and thus light in weight.

A lighter-than-air unit of this type may be made by blowing bubbles or cylinders with curved ends with helium, hydrogen or other lighter-than-air gas in a glass-blowing machine, or alternatively by hand. The basic method used comprises the following steps:

(1) Accumulating sufficient molten glass on the end of a blowpipe to form the desired size and shape of the lighter-than-air unit;

(2) Supplying pressurized lighter-than-air gas to the blowpipe until the molten material is blown into the desired shape;

(3) Removing said blowpipe end from its attachment to the lighter-than-air unit.

To these basic three steps various other steps may be added. For example, one method of making the units in the form of round-ended cylinders or egg-shaped vessels, is the following:

(1) Ladling from a glass furnace a sufficient quantity of the molten glass to form the desired lighter-than-air unit;

(2) Transferring and pouring the ladled material into a heated shallow fireclay pot;

(3) Lowering the head of a blowpipe into the molten glass;

(4) Forcing lighter-than-air gas down the vertically held blowpipe into the glass and steadily drawing the vertical pipe upward as the supplying of gas into the molten material is continued;

(5) Lifting the inflated soft-glass cylinder thus formed until it has a rounded lower end and clears the emptied fireclay pot;

(6) Moving the blowpipe and attached glass cylinder, while they are still held upright, into a refrigerated chamber;

(7) Quickly, after step (6), pinching off the glass neck that attaches one end of the cylinder to the blowpipe by means of wet and/or chilled pincers (which may be shaped to form a curved glass surface at said end), and removing the blowpipe from the chamber;

(8) Quickly cooling the resulting lighter-than-air unit by allowing it to float upward thru the refrigerated chamber until it rests against a foam rubber pad at the top of the chamber.

Another method of making the cylindrical units comprises the following steps:

(1) Gathering on the blowing head of a blowpipe an amount of molten glass that will make the desired cylinder;

(2) Holding the pipe vertical, forcing pressurized lighter-than-air gas into the mass of molten glass and simultaneously rotating the pipe until the glass is in the form of a thin-walled cylinder with a rounded end;

(3) Moving the upright soft-glass cylinder thru an opening in an end of a refrigerated chamber, and breaking off the glass neck attaching the cylinder to the blowpipe by a wet and/or chilled pair of curved pincers that also close the said opening when they are brought together; and (4) Quickly cooling the lighter-than-air unit in the refrigerated chamber—in liquid, air or a cold-liquid metal jacket within the chamber.

A method suitable for making a cylindrical, globular, egg-shaped, or pear-shaped unit comprises:

(1) Gathering a ball of molten glass on the head of a blowpipe;

(2) Rotating the blowpipe and ball of glass, and partly blowing up the lighter-than-air unit by forcing lighter-than-air gas thru the pipe (for example, from a small tank of the compressed or partly-liquified gas, fixed to an intermediate portion of the blowpipe, rotating with it, and flow-connected with the molten glass via a controllable valve);

(3) Swinging or pivoting the blowpipe and thus moving the partly blown glass into an open, gently-heated mold, that has hinged halves and is interiorly shaped according to the desired surface of the lighter-than-air unit, while the blowing head of the pipe remains just outside the mold;

(4) Closing the mold around the soft glass, leaving a gas supply hole tightly registering with and against the hole in the blowing head;

(5) Continuing to supply gas to the blowing head until the glass is forced against the mold and into the desired shape;

(6) Ceasing to heat the mold and beginning to cool it by circulating cooling liquid or air thru a jacket in the mold;

(7) Pinching the glass neck that has flow-connected the blowing head to the blown article by means of a pair of wet and/or chilled pincers that closely slide between the blowing head and the mold, thus hermetically sealing the gas in the blown vessel;

(8) Quickly completing the cooling of the lighter-than-air unit; and (9) Taking the lighter-than-air unit from the mold, removing the surplus glass, if any, at the pinched portion, and, if desired, shaping this portion so that it has a convex outer surface.

Various other methods, each comprising the above-listed basic three steps, may be utilized to make the lighter-than-air units. These methods may be performed by hand, but preferably are carried out by machines that are somewhat similar to but also are different from known machines for making bottles. Also thin-walled, all-glass vessels containing vacuums may be made in machines that are somewhat similar to those that make electric light bulbs or radio vacuum tubes; but the lighter-than-air vacuum vessels have no metal in or on them.

The type of glass that is preferred is light in weight but dense and strong. No lead oxide is used in it, and preferably it contains little or no soda and a substantial amount of potash. Barium oxide is frequently used in making hard, optical glasses; but its weight prevents a preference for it in the glass of these lighter-than-air units. Potassium oxide, instead of sodium oxide, aids in making a hard, strong glass. Potassium has the further advantage of being lighter than sodium. An example of a good glass for these units consists of the following percentages of materials: silica, 72; potash, 15; lime, 10; potassium oxide, 2.5; and alumina, 0.5.

Without further treatment the lighter-than-air elements of glass may be placed within compressed gas in the rubber-and-fabric tubes; but preferably they are loosely and quite flexibly joined in a chain by connecting them with foam rubber at their upper and/or end surfaces; or alternatively each glass unit is dipped in rubber cement, and the resulting coat is cold-vulcanized by its exposure to sulfur chloride as vapor or in solution. In FIGURE 1 three sizes of the light-gas containers and three different, interchangeable ways of lightening possible shocks of their contacts are shown at 5, 6 and 7. Globes 6 preferably are made with rubber-cement coating of the above-described type. They float freely in the compressed air or other gas of tubes 3; and when these tubes flex the spheres quickly move away from any bending point of the rubber-and-fabric envelope and tubes. If the globes are of glass the rubber coating is desirable; but if of metal, or of plastic of a type that is nearly impermeable to gas, the rubber coating preferably is eliminated. Spheres 5 are cemented at their tops to thin, narrow, highly flexible strips 8, which preferably are of foam rubber, but may be of fabric or unspun cotton. These strips preferably are glued to the top inner surface of the hollow wing.

Before assembly in the annular tubes 11 that form the ribs of fuselage 9, the globes (or round-ended cylinders) 7 of each set are inserted and cemented in tightly fitting holes cut in foam-rubber strip 10. Then the rubber-connected units are inserted in the hollow space of each annular tube of uncured, fabric-sheathed rubber; the ends of the tube are welded by the aid of naphtha; the tube ends are reinforced with cemented bands of fabric around the joint; and the rubber is vulcanized.

Tubes 12 are shown as not containing any lighter-than-air units, and tubes 3 may be built in the same way; but in practice both the upper and lower wing tubes preferably contain the lifting elements. Except in reinflation of the tubes with air in an emergency, these wing tubes preferably are inflated with ammonia, helium or neon; and the lighter-than-air sealed units that float in this gas preferably comprise hydrogen. This hydrogen thus would be thoroughly safeguarded against burning—by its containers of material that is impermeable to gas and also by the lighter-than-air non-combustible gas that surrounds them.

The larger lifting units 14 are in long, balloon-like, inflated tubes 16, which are rubber-cemented together and to an outer envelope 18 of rubber-and-fabric. The upper portion of this envelope contains a third, long, balloon-like tube 20 similar to tubes 16, which is aft of and fixed to engine nacelle 22. This tube is also inflated with ammonia, air or other gas and contains freely floating lighter-than-air units. To its grooved forward end the engine nacelle is fastened by metal band 24. The engine casing has exhaust ports 26.

The craft's landing gear may be of the commonly known retractable type; or, optionally, it may have its wheels partly projected from the fuselage, as shown in FIGURE 1. Except for their bearings 28, these wheels consists of annular, concentric, inflated tubes of rubber and fabric. Radially outward from the outer race of the bearings there are two small inflated tubes, and fitting within the central recess between the outer peripheries of these two tubes there is a larger tube 30 which has a diameter substantially equal to twice that of one of the smaller tubes. Two other smaller tubes 32 have their inner, V-shaped, contacting surfaces resting against and tightly inflated on tube 30. And finally the outer tip of the wheel comprises tube 34, which sharply streamlines the outer portion that projects into the airstream. All these tubes are separately inflated and rubber-cemented together, are placed in and cemented to an outer envelope 36 of rubber-and-fabric, and are fully inflated after this assembly.

Figure 11:
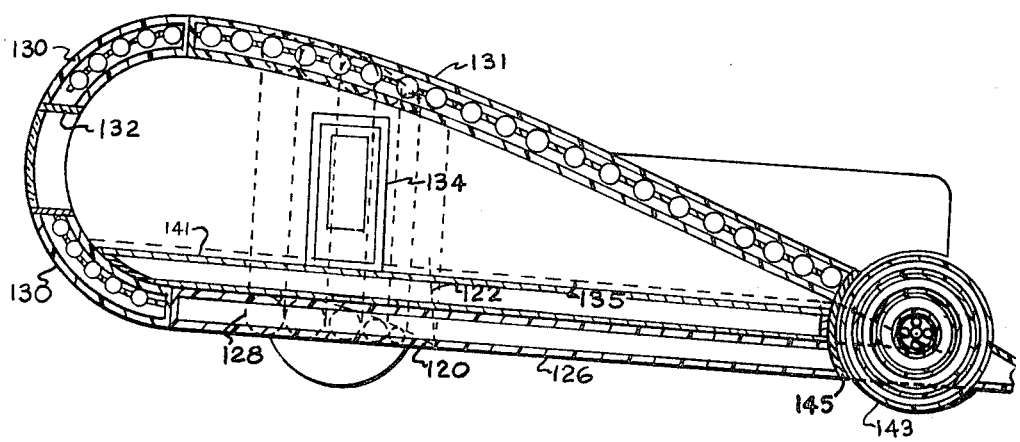
FIGURE 11 is a sectional view, on an enlarged scale, from the plane 11—11 of FIGURE 10, with the inner-lining elements 135, 136 omitted.

There is also a similar tail wheel, like that shown in FIGURE 11, which acts as a streamlined, stabilizing fin. If desired, lighter-than-air units 38, having flexible metallic or plastic walls, preferably inflated or filled with helium, may be placed within these wheel tubes.

Figure 2:
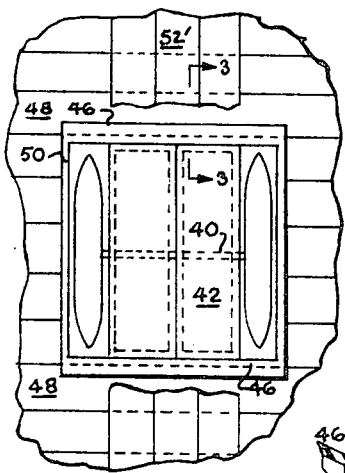
FIGURE 2 is a detail plan view of the craft's wheels, fuel tanks and fuselage tubes, partly broken away, and taken before foam rubber is poured over the fuel tanks, and showing a variation of the arrangement and sizes of these tanks.
Figure 3:
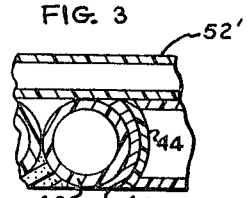
FIGURE 3 is a detail view, in section from the plane 3—3 of FIGURE 2, of the junction of the fuel tanks and wheel-supporting tubes.

The wheel bearings are supported by axle 40, which is fixed within and sealingly bonded to inflated tubes 42. As indicated in FIGURE 2, these short tubes are parallel to the longitudinal axis of the fuselage; and the concave rubber-and-fabric sheets 44 (shown in FIGURE 3) that hermetically close their ends fit on and are bonded to a curved surface of metal plates 46, which also are bonded to sides of annular, rib tubes 48. Plates 46 are welded to vertical side plates 50. And plates 50 are bonded to the rubber-and-fabric disks that are united to and close the ends of those rib tubes whose annuli are interrupted to provide space for the wheels. Thus a wheel-supporting and tube-bridging metal frame is provided, within which axle 40 and the wheel bearings are resiliently suspended by numerous inflated tubes.

Above this frame and the tubes 42 lie three long, cylindrical fuel tanks 52 which extend the length of the fuselage, and give it longitudinal stiffness. These containers are indicated to be plastic tubes (preferably fabric-reinforced); and they may be metal tubes; but alternatively and as indicated in FIGURE 6, they may comprise a small-diameter, helically-wound, inflated tube 54, which is of rubber-and-fabric or other flexible plastic. Its successive coils are bonded and vulcanized or otherwise welded together; and the resulting inflated helix is sheathed and held to a fixed outer diameter by a cylindrical outer envelope 56 of rubberized fabric.

As indicated in FIGURE 1, the fuel tanks directly rest on and are cemented or bonded to tubes 42; but optionally these craft-trimming tanks may be separated from tubes 42 by a cushion of foam rubber. In any event, foam rubber (or other flexible-plastic foam) is poured and vulcanized in a flat walk over tanks 52; and also, in a separate operation, foam rubber is poured on lower tubes 42, forming a coating 58, which has the general cylindrical shape of the fuselage.

FIGURES 1 and 5 illustrate a means for inflating the connected rib and wing tubes. All these tubes have the same diameter. Rib tubes 11 are inflated with air, ammonia or other economically available gas thru valves 60. From each of these tubes the gas goes thru holes 62 into a pair of aligned wing tubes 12; and from at least one of the rib tubes the gas flows thru holes 64 into members 66, made of fabric-reinforced rubber or other flexible plastic. These hollow elements 66, shown on an enlarged scale in FIGURE 5, are pearshaped in order to conform with the inside upper curvature of the wing; each has its lower portion below the horizontal line 68 of the junction of a wing and the fuselage. These elements 66 serve two purposes: they strengthen the junctions of the wings and other upper elements of the craft because they are bonded to cylinders 16, some of the wing tubes 3 and some of the rib tubes 11, thus stiffening all these elements against excessive longitudinal or transverse bending; and each of the hollow members 66 conducts inflating gas from at least one of the rib tubes 11 to those wing tubes 3 above it that have no junctions with rib tubes 11 and thus cannot be directly supplied with gas from the rib tubes. The gas is thus conducted to some of the upper wing tubes via holes 70; and these tubes are in flow-communication with tubes 72 and 74 via holes 76.

Alternatively and in lieu of holes 70 and 76, the wing tubes that are bonded to cylinders 16 may have apertures which register with holes in tubes 16. These cylinders or balloons 16 and the similar inflated tubes 20 are separately inflated thru valves 78.

In the form of the invention shown in FIGURES 7 to 9 the main parts of the fuselage and wings are built in a manner similar to those of the craft of FIGURES 1 to 6. The interior of the fuselage and the landing gear also may be constructed like those of the preceding figures, but as shown in FIGURE 8 they comprise variations. At the top of the interior a multiplicity of lighter-than-air units 80 float and exert a lifting force against the upper wall of the fuselage. Preferably, these elements are cemented to the top surface of a thin foam-rubber pad 81 which is stretched a little and glued to the side wall of the interior.

Figure 4:
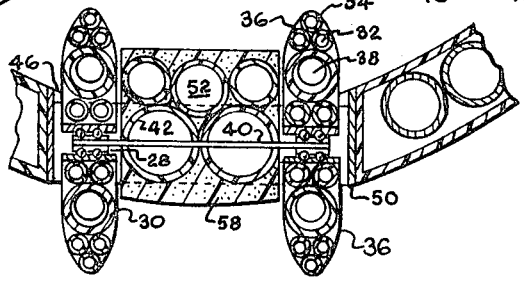
FIGURE 4 is an enlarged cross-sectional view, partly broken away, of the wheels and their supports, showing an optional way of flexibly uniting the fuel tanks and other wheel-supporting tubes.

The fuel tanks are made of aluminum or magnesium alloy, or of plastic, as shown in FIGURE 4 or FIGURE 6; they extend the length of the fuselage, and their unitary flat top 82 provides a walk. The main, center tank 84 is flanked by four auxiliary, reserve tanks 86, of which only two are visible in FIGURE 8. The two abutting tanks on each side of the vertical plane thru the axis of the fuselage have their common junction wall at approximately the thwart-ship line of the craft's normal center of gravity. These auxiliary tanks serve two purposes: (1) the storage of *reserve* fuel; and (2) as means for providing correct fore-and-aft and lateral trim of the craft. If its load has caused the center of gravity to shift forward the pump that is in connection with these auxiliary tanks transfers fuel from the after pair of tanks 86 to the forward pair; and vice versa. If the center of gravity of the plane has shifted to the starboard (right) of the fore-and-aft axis the pump draws fuel from the starboard two tanks and supplies it to the port (left) pair, until the center of gravity is in its desired position.

The wheel bearings 88 may be retractable, or supported in the manner indicated in FIGURES 1 to 4; but they are shown in FIGURE 8 to be resiliently supported by springs 90. The upper coils of the springs for each wheel bear on metal supports 92, which are welded to a streamlined metal box 94. These boxes are bonded and tied by cords or bands to the fuselage; they are further prevented from spreading apart by cables of metal 96 which force the waterproofed outer fabric of the fuselage into the V-shaped spaces between two of the inflated annular rib tubes.

In this form of the invention the engine and propeller are mounted within a tubular element or propulsion ring 98. The streamlined engine housing is welded to the streamlined fore-and-aft metal plates 100, which are tightly bound by means of bands 101 to some of the inflated annular tubes of ring 98—that is, to a pair or more of these tubes at the middle of 98. These annular tubes are preferably of fabric-reinforced rubber or other flexible plastic, are bonded together at their sides and are of varying diameters calculated to cause their encasing envelope of rubberized fabric to form a Venturi tube. The propeller 102 is located at approximately the plane of the maximum choke of this tube—that is, opposite the inflated tube 104 which has the largest diameter of the propulsion-ring tubes. Consequently, the incoming air ahead of the propeller applies a partial vacuum on the forwardly flared front surfaces of the propulsion ring, exerting a traction on these surfaces, while the air under pressure aft of the propeller exerts a pushing force on the rearwardly flaring surfaces of the Venturi tube.

Fixed to the top of propulsion ring 98, and extending from the forward edge of the ring rearward and downward to the tail of the craft, there is a combined lifting element and stabilizing fin. This member comprises a plurality of inflated tubes, 106, 107 and 108, of different streamline-providing diameters, and an encasing envelope of rubber-and-fabric. In its after part, which serves as a tail fin, the positions of the tubes in the envelope (with tube 108 aft of 107 and 107 aft of 106) and the snug fit of the envelope over the front surface of large tube 106 provide needed streamlining. The part of the lifting and stabilizing element that juts over the propulsion ring is bonded to the ring and tied to it by means of sewed threads, cords or bands, sealed over by waterproof glue or the like. In this horizontal part, the envelope, as shown in FIGURE 8, does not snugly encase the lower arc of tube 106, but instead projects downward, as indicated at 110, in a vertical or nearly vertical direction. These tubes contain lighter-than-air units 11.

The after end of large tube 106 is sewed or tied and bonded to the rubber and fabric of the skin and the inflated rib tubes of the fuselage, but tubes 107 and 108 rest on and are affixed to the metal, horizontal, stabilizing plate 112, and this plate in turn is tied and bonded to the skin and rib tubes of the fuselage.

Although the pumping of fuel between the forward and rear pairs of auxiliary tanks 86 may suffice for control of the plane's attitude about its transverse axis, there optionally may be provided a conventional elevator 114 hinged to stabilizer 112. Rudder 116, shown in FIGURE 7 as partly broken away, is pivoted on its hinge 118 by means of conventional, pilot-actuated controls.

Figure 10:
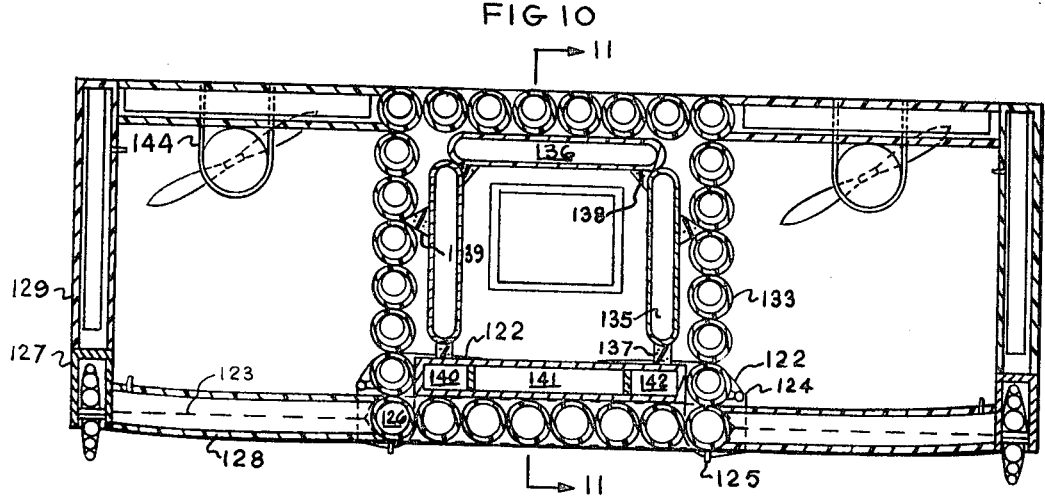
FIGURE 10 is a rear elevational view in section of a third form of the invention, with the vehicle's walls 30 shown before the outer skin is fixed to them.
Figure 12:
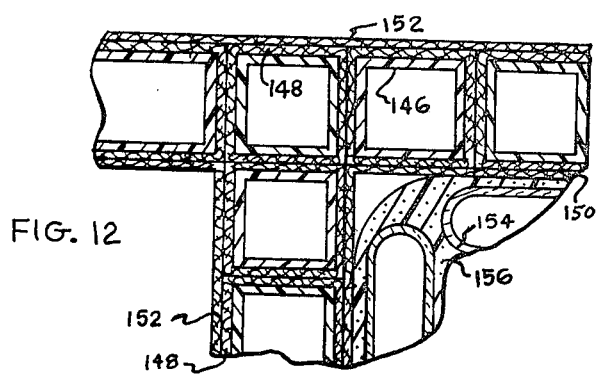
FIGURE 12 is an enlarged view in section of an alternative detail of construction of the inflated tubes of the fuselage and wings.

In the form of the invention shown in FIGURES 10 to 12, two engine-and-propeller assemblies are utilized; and the craft's attitude and direction may be varied by pilot's control of the throttle and/or propeller pitch angles. No rudder is necessary; and climbing or gliding is determined by control of wing flaps of resilient rubber 120 by means of looped cables 122. These schematically-indicated cables are shown as broken away inside the fuselage; they pass over pulleys (or thru metal eyes) 124, mounted on the vertical fuselage side walls, thru or over element 125, and are fixed to free ends of the wing flaps. The opposite end of each wing flap is bonded to element 126, one of the bottom, longitudinal, inflated tubes of the fuselage. Lateral stability and angle of climb or glide is thus controllable by separately or jointly warping these rubber-and-fabric wing flaps. Optionally, eyes or pulleys 124 may be mounted on metal bars projecting aft from metal wheel frames 127, in which event the wheelward ends of the flaps are free of bonding attachment to 127, and may be pivoted against their resiliency, and their opposite ends preferably are bonded to tubes 126 and their waterproofed envelope.

The wheel supports or recesses 127 are rectangular in horizontal and vertical cross sections and are bonded to the rubber-and-fabric of some of the lower wing tubes 128 and vertical inflated tubes 129. The wheels are of the above-described type; they bear on axles that are welded (or spring-supported) on the side walls of the wheel frame.

Tubes 128 of the lower wing optionally may not contain lighter-than-air units, but at least all the other inflated tubes of the craft are shown in FIGURES 10 and 11 as housing the floatingly-supported lifting units. Some of the bottom wing tubes (at least three in each wing) contain cables 123 of polyethylene, metal or the like which are fastened at their outer ends to the inner side walls of the wheel boxes. From each wheel frame one of these tensed cables extends straight to the middle of the nearest bottom fuselage tube 126, and there joins a loop of cable which goes over and under all the bottom tubes. Turnbuckles in these lines enable them to be tensed. Thus the wheel frames, the lower wing and the fuselage tubes are held tautly together.

The fuselage is rectangular in transverse cross section, and is streamlined by curving its thick forward part and streamline-curving the top tubes to slope from the wide nose of the craft to its equally wide but vertically thin tail. This is accomplished by providing separately inflated front tubes 130, top tubes 131 and lower tubes 126 which are bonded together but are not in flow-communication with each other. Some of the forward tubes 130 are short and bonded to a metal frame 132 which incloses a windshield of transparent plastic or glass. Some of the side tubes 133 of the fuselage also are short and are bonded to frame 134 of an entrance door or other port. Frames for smaller side-wall ports may be supported in the same manner.

The sides and top of the interior of the fuselage comprise round-ended cylindrical vessels 135 and 136 that contain lighter-than-air gas or vacuums. These cylinders may be of thin-walled but dense light-weight plastic, of glass, or of metal as indicated in FIGURE 10. The lower cylinders 135 are glued to long strips 137 of foam rubber, which are also cemented to the tops of fuel tanks; and the upper cylinders 136 are connected to vessels 135 by long V-shaped strips 138 of foam rubber. Optionally, the lower cylinders may be cemented to conical, foam-rubber projections 139, the points of which are glued within grooves between adjacent side-wall tubes of the fuselage. Preferably these lighter-than-air units are of thin metal and are inflated with lighter-than-air gas at a pressure a little greater than that of the atmosphere. Their side walls are joined by foam rubber.

Over nearly the full length of the bottom of the fuselage there is a walk which comprises the integral, flat, horizontal tops of metal fuel tanks 140, 141 and 142. These tanks are similar to those described above: there are two aligned-fore-and-aft auxiliary reserve tanks 140, one long main tank 141 and two other aligned reserve tanks 142; and trim of the craft is achieved by pumping fuel fore and aft or laterally between the pairs of reserve tanks.

As indicated in FIGURE 11, the forward walls of these tanks are curved to fit the lower curvature of the arcuate inflated tubes 130 of the forward part of the craft, and the rear walls of the tanks are curved to fit and are welded to the curved forward plate 145 of a metal frame or housing for tail wheel 143.

The engine housings are suspended from and tied to the upper wing tubes by means of cables or bands 144. These cables are securely fastened to the engine housings (preferably in housing grooves so as not to interfere with the engine nacelle's streamlining) and extend between and are fastened over the wing tubes.

In lieu of the cylindrical rubber-and-fabric tubes of FIGURES 10 and 11 (or of any other form of the invention) inflated tubes that are square in cross section, of the type shown in FIGURE 12, may be utilized. These may be economically manufactured by extruding rubber compound 146 downward from extruder dies of square configuration into a fabric envelope or sack 148; and the composite tube is completed by the steps described above in connection with the round tubes.

In assembly of these tubular elements, a long fixture that is rectangular in cross section is utilized. Around this fixture fabric 150 is tightly wrapped, and around this the slightly inflated tubular members are arranged and held in clamped juxtaposition, with cement between their contacting side walls and also between their walls and the inner sheet of fabric 150. Then the waterproofed fabric of the outer skin 152 of the fuselage is tightly wrapped and cemented around the square tubes. After the cement is dried the partially built fuselage (open at its forward end) is pulled off the fixture, and the tubes are further inflated, against the tension of tightly enveloping skin 152, which is prevented from bulging at the longitudinal center lines of the square sacks 148 by its tension and cementing to these sacks and rubber tubes. Corrugations would be produced at these lines if fabric envelopes 150 and 152 were loosely wrapped around the square tubes and the tubes were fully inflated before being cemented to the fabrics; but such undulations of the skin are undesirable, for they involve increased skin friction of the fuselage in the airstream; and they are prevented by the bonding of the tightly wrapped fabric sheets to the tubes while they are only partly inflated.

Thru the large open end of the fuselage an inner lining is now inserted. It comprises containers 154 of lighter-than-air gas or vacuums, connected together in a matrix 156 of foam rubber which forms cushioning walls of the interior of the fuselage. Like the liner of FIGURE 10, this one in FIGURE 12 is three-sided; and the floor of the fuselage is the top of the fuel tanks. Although the receptacles 154 obviously may be of other gas-container materials referred to above, they are shown in FIGURE 12 as made of glass.

The front tubes and windshield are now bonded to the ends of the longitudinal fuselage tubes; and the craft is otherwise completed as indicated in FIGURES 10 and 11.

Figure 13:
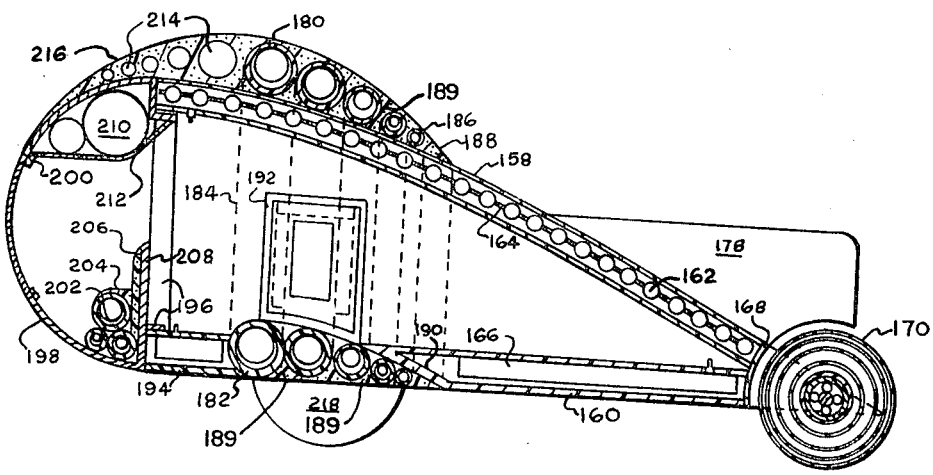
FIGURE 13 is an elevational view in section of a fourth form of the invention.
Figure 14:
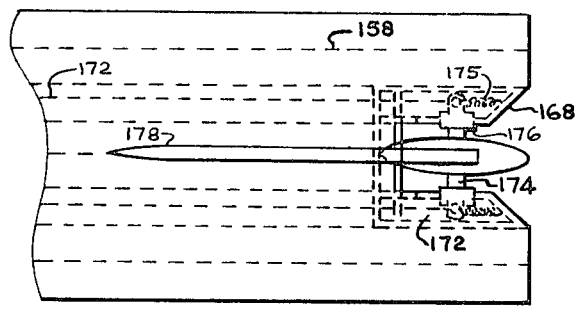
FIGURE 14 is a plan view, partly broken away, of the tail of the aircraft of FIGURE 13.

In the fourth form of the invention, shown in FIGURES 13 and 14, the airplane has a generally rectangular configuration in transverse section that is similar to that shown in FIGURE 10. This craft has three separately fabricated parts: an after part comprising the main portion of the fuselage, the tail fin and the tail wheel; the metallic nose portion and the windshield that it supports; and the pair of wings and their vertical supports and front streamlined fairing.

The major portion of the fuselage comprises inflated rubber-and-fabric tubes 158 and 160 and sidewall tubes that are similar to tubes 133 of FIGURE 10 or those of FIGURE 12, all of which are square or round in cross section, have equal cross-sectional area, and contain lighter-than-air units. The side-wall tubes are parallel with tubes 160, and each of their rear portions is cut and closed with a rubber-and-fabric piece at the angle of the tube's bond with the streamlined upper tubes 158. These upper tubes are shown as containing numerous globes 162 of lighter-than-air or vacuums. These spheres optionally may be connected by a foam-rubber strip (or, alternatively, with separate foam-rubber pieces) 164. Lower tubes 160 also may contain such globes, but as shown they hold lighter-than-air cylindrical containers 166.

These inflated tubes may comprise extrusions in fabric envelopes or may be made by a mandrel-utilizing method. They are assembled on a fixture that may be controllably supported either at its forward or after portion. While it is forwardly supported, upright tubes 158 and 160 and the fuselage side-wall tubes, moderately inflated, are temporarily clamped to the fixture. At their rear ends the four middle tubes 158 and the opposite four of the lower tubes are bonded to the metal frame or housing 168 which supports the tail wheel 170. This wheel comprises concentric inflated tubes, is of a large diameter, is sharply streamlined, and in the air acts as a rudder. It is pivoted for steering in the air or on the ground due to the pilot's actuation of cables 172. The frame contains pockets 172, into which the ends of axle 174 project. These ends comprise eyes to which the control cables are fastened. Each eye is also connected to the frame by a tension spring 175 which resists forward pulling of the cable and axle end.

The wheel has antifriction bearings on the axle; and the axle is slidably and pivotally supported in bearings 176 that are exteriorly grooved to fit and slide in a fore-and-after slot in walls of pocket 172. These bearings are of the type shown in section at 236 in FIGURE 15.

Tail fin 178 is made of metal or plywood. Its lower edge is clamped and cemented or bonded between the middle pair of tubes 158, and in its after portion it is fixed to frame 168. Optionally, there may be provided a conventional rudder that is hinged to the upright rear edge of fins 178.

To each side of the fin 178, along a line that is level with the top of an adjacent fuselage tube, a waterproofed fabric skin is fixed. This skin envelops and is cemented to the after fuselage tubes; and after these are fully inflated it is smoothly continuous.

The two wings comprise straight upper and lower wing tubes 180 and 182 that are joined at their ends to vertical side tubes 184. Each of these tubes is closed at each of its upper and lower ends by a piece of rubber-and-fabric that is bonded to the end closure of an adjacent wing tube. Back of this joined set of four tubes there are other similar sets; but to provide the proper airfoil contours, these are of consecutively smaller diameter, ending with the smallest tubes 186. Rearward of these tubes, the streamlining of the wings and their vertical connecting members is completed by trailing-edge elements 188, which are shown to be of foamed synthetic rubber within a rubberized fabric envelope, but optionally they may comprise firmer rubber or other flexible plastic. At their outer ends these elements are free of connection and are controllable in the manner of the warpable wing flaps of FIGURES 10 and 12.

After the sets of wing and wing-supporting tubes are bonded together on a separate fixture, and foam rubber, part of which is indicated at 189, is poured within their outer envelope of waterproofed fabric, they are moved to the main fixture, which is now supported at its forward part, leaving the after end of the fuselage free of attachment. Over this rear end the connected wings are moved, into the position shown in FIGURE 13. Lower tubes 160 comprise forward, tube-closing parts 190, and to these the after part of the middle portion of the lower wing is now cemented or bonded. The lower wing is also bonded or otherwise fixed to the curved lower part of door frame 192; and the upper wing is bonded to a middle group of tubes 158.

To the front wing tube 182 short fuselage tubes 194 are cemented or otherwise fastened; and these tubes are also cemented to each other.

At this point in the fabrication, the partially-built craft is withdrawn from its fixture by pulling its wide front opening backward over the fixture. Then within this opening—within the forward ends of the fuselage tubes—the metal flange 196 of nose frame 198 is inserted, and bonded, and otherwise securely fastened in place by tie-cords extending around tubes 158 and 194 and thru holes in flange 196.

Thru the front of nose frame 198 there is a wide, substantially rectangular opening, in which a transparent plastic or glass windshield is mounted. It is cemented and bolted or screwed to flange 200, which is rectangular in outline and is screwed or welded to frame 198.

Secured to the lower part of the frame there are seats for the pilot and some of the passengers. There are two of these seats, with a passageway between them. Each comprises straight, inflated tubes of different diameters, which preferably inclose lighter-than-air units 202. Cushions 204 and 206 of the seat comprise foam rubber that is bonded to upright continuations 208 of frame 198.

Lighter-than-air units 210—preferably globes—float against the upper part of this frame. They are limited in downward movements—caused by accelerations or outer-tube shocks—by the thin sheet 212 of foam or other rubber, which is cemented to the upper bars of flanges 196 and 200.

Lighter-than-air units 214, which preferably are globes or round-ended cylinders and have thin-metal shells, are now cemented below a thin sheet of foam rubber, which in turn is cemented to the inside surface of a waterproofed-fabric covering that has been cut and sewed in curved-edged gores, and thus shaped to fit the outer contours of the wings and fuselage nose. This covering is wrapped, cemented, and fastened at its joining edges, and is closely fitted and bonded around the moderately inflated wing tubes, tubes 194 and the lower part of the outer surface of frame 198, and very loosely wrapped around the upper surface of this frame and the parts of tubes 158 that are forward of tube 180. Next the wing tubes 180–186 are fully inflated, against tension in areas of the fabric skin that are above and below them; and a small flap is cut in the loose part of the skin forward of tube 180, and hinged aside to form a closable hole. Thru this hole foam rubber is now poured, filling the spaces between lighter-than-air units 214 and filling out the top of the forward part of the fabric skin at 216, so that it merges with the after part of the top wing in a continuous streamlined contour. Tubes 194 are now fully inflated, causing the forward part of the skin to be very taut.

Wheels 218 are similar to those of FIGURE 10, and are supported in the type of frame there shown at 127.

This craft could be used as a glider, but preferably has propulsion units of the type shown in FIGURE 10. Alternatively and optionally, the rearmost tips of tubes 158 and 160 may be cut off and replaced (as indicated in FIGURE 15) by lateral extensions of frame 168 that house two laterally spaced jet-propulsion units of conventional type.

In FIGURES 13 and 14, there thus has been shown a light-weight biplane whose top wing provides an aerodynamic, vacuum-producing lift above the fuselage and whose bottom wing provides an aerodynamic (fluid-dynamic) pressure below the fuselage. These lifting forces are in addition to those of the many lighter-than-air units, the lifting force of both the tops and bottoms of those parts of the wings that are clear of the fuselage, and to a lift provided by the fuselage itself, which has bottom surfaces that are flat, with a small angle of attack, and top surfaces that are aerodynamically streamlined.

The fifth form of the invention, shown in FIGURES 15 to 19, also presents an airplane with a fuselage that has flying-wing characteristics. The inflated tubes of this craft contain lighter-than-air units and are illustrated as being round in cross section, but optionally they may be square, of the type shown in FIGURE 12. All except those at the nose and at the top of the fuselage preferably are straight. The waterproofed fabric at the bottom of the tubes has a small angle of incidence, to provide a lifting force from the lower contour of the fuselage.

The curved front inflated tubes are similar to those shown in FIGURE 11. Of these, the two at the front corners of the fuselage, indicated at 220, are relatively long, and between them front tubes 222 are short and hold the top and bottom of a frame 224, of a transparent windshield. This frame is fastened by bonding and tie-cords to the inner sides of tubes 220 and to top and bottom end-closure disks of rubber-and-fabric tubes 222. Broken line 226 indicates the line of division between the nose tubes and those of the fuselage. The top fuselage tubes 228 are curved for streamlining of the upper surface of the fuselage, thus causing it to have an upper aerodynamic lift, in addition to the lift produced by its flat (or optionally cambered) bottom.

At the tail of the craft the middle ones of the top tubes are bonded and fastened by cords or bands to metal frame 230. The middle ones of bottom tubes 232 also are secured to element 230. This frame comprises: a well 234 for the tail wheel; supports for bearings 236; a pair of tail-streamlining chambers 238, which are approximately triangular in cross section thru a vertical plane parallel with the craft's longitudinal axis; and metal bands 240, which surround and are fixed to jet-engine units 242.

Well 234 completely surrounds the upper half and a little of the lower half of the tail wheel. This wheel functions for steering on the ground or in the air. Its structure is like that shown in FIGURES 11, 13 and 14; it comprises bearings on axle 244.

This non-rotary shaft is square in cross section, or optionally it may be round and have on it a bushing that has a square outer surface. When the tail wheel is turned the axle (or its square-surfaced bushing) slides in bearings 236, each of which, as indicated in FIGURE 17, is mounted and slides in a slot of frame 230.

In pivoting the steering wheel, the pilot rotates control wheel 246. One end of the rod 248 (which rod crosses and is fastened to the lower end of the rotatable stearing post on wheel 246) then pulls forward a cable 250, while the other rod end moves to allow the other cable 250 to be pulled aft by one of the pairs of tension springs 252. At the same time the other spring 252 is being further tensed by the forward traction of its cable 250. When the pilot returns the control wheel to neutral position the tension of the springs is equalized, with return of the tail wheel into fore-and-aft position.

Control of the craft's attitude about its roll axis and/or control of its climbing or gliding angle may be achieved by warping its rubber-and-fabric wing tips as described in connection with FIGURE 10. A preferred variant of this type of wing-flap control is shown in FIGURES 15 and 19. Each wing flap 253 has imbedded in its rubber a long rod or bar 254, preferably of aluminum alloy, and to the ends of this element two cross rods or bars 256, are rigidly fixed, as by welding. Each rod 256 is imbedded in the rubber of an end of flap 252. One end of bar 254 projects into the fuselage and there has a cross rod, to the ends of which a pair of pilot's control cables 258 are fastened. By conventional control linkage, the pilot thus can actuate these cables in opposite directions, and thus rotate rods 254 and 256, and move the trailing edge of either flap up or down. By equally actuating both flaps he controls the rate of climb or gliding angle; and he also may exercise this type of control by pumping fuel between pairs of reserve fuel tanks of the type shown in FIGURES 8, 10, 11 and 13.

FIGURE 16 indicates the manner of fixing the wing tubes 260 to the vertical tubes 262 that connect the two wings. The wing tubes are shown as being cut to fit the contour of the vertical tubes, to which they are directly bonded. Alternatively and as shown in FIGURE 12, each of the wing tubes may have a separate closure disk of rubber-and-fabric, and this disk may be curved to fit the vertical-tube circumference if the tube is round.

Engine-and-propeller assemblies of the type shown in FIGURE 10 preferably are utilized, in which event the schematically indicated jet motors 242 are for jet-assisted takeoff, or they may be eliminated. By means of porous-ceramic or other insulation, 264, these jet motors are prevented from overheating the adjacent rubber tubes.

All the inflated tubes of this invention are stiffened and strengthened by compressed gas within them at a pressure well above that of the atmosphere—preferably in the range of eighteen to thirty-five pounds per square inch. The pressure chosen for each tube may depend on its location. For example, where an inflated receptacle forms part of the strength-providing framework of a wing, or of the vertical framework that connects the ends of biplane wings together, or of an engine supporting means, or of the longttudinally-stiffening part of a fuselage, the pressure of its compressed gas preferably is in the range of twenty-five to thirty-five pounds per square inch. But where a tube is not subjected to so much force, the pressure of its inflating gas preferably lies in the range of eighteen to twenty-five pounds per square inch.

The craft of this invention thus has much more rigidity than the currently known balloon or aviator's inflated liferaft. And yet, unlike known airplanes or dirigibles, which have comprised rigid, metal structural parts, the presently provided aircraft can yield under the severest shocks a large multiplicity of times, and each time return without damage to its former configuration.

In any of the forms of the present invention, the currently preferred type of inflated tube that is part of the wings, engine-supporting means, fuselage deck or landing gear comprises compressed inflating gas at a pressure of twenty-eight to thirty pounds per square inch; and the preferred form of the other tubes of the craft comprises inflating gas at a pressure of eighteen to twenty pounds per square inch. If the lighter-than-air units within the tubes contain hydrogen the compressed gas adjacent to these units preferably is non-combustible. A preferred example of such a non-combustible gas is ammonia. It unites with oxygen only in presence of a special catalyst, such as platinum gauze. It is considerably lighter-than-air, and may be readily and economically procured.

The lighter-than-air units may be eliminated from any of the tubes of the above-described forms of the invention: and the tubes may be inflated with air, any known lighter-than-air gas, or air mixed with any other gas; and any of the tubes may be made of thin, very ductile metal, or of any dense but yieldable and flexible plastic.

In the claims the word "plastic" is used to signify any type of natural or synthetic rubber or other plastic, the word "gas" to mean any gas or gaseous mixture, the word "tubes" or the words "tubular receptacles," "tubular elements" or "tubular members" (unless otherwise specified) to mean unitary or composite hollow articles of any cross-sectional shape, that have ends or are curved and endless, and the word "vehicle" to signify any known type of conveyance.

I claim:
1. A lightweight vehicular structure having:
   an outer skin means, comprising fabric and flexible waterproofing material;
   lightweight gas-cell-containing, resilient, shock-absorbing plastic within said skin means;
   within said plastic, a plurality of adjacent, vehicle-strengthening, hermetically-sealed receptacles, curved in cross sections; and
   gas under pressure above that of the atmosphere in said receptacles.
2. A device as set forth in claim 1, in which said gas is lighter than air.
3. Structure as set forth in claim 1, in which the material of said receptacles comprises fabric, coated and permeated with plastic that is denser than said gas-cell-containing plastic.
4. Structure as set forth in claim 1, in which the material of said receptacles is glass.
5. A vehicle comprising:
   a body having bottom, side and top walls, forming a load-confining space;
   a group of inflatable, resilient, juxtaposed, tubular elements of flexible material, fixed to said body, below said bottom wall; compressed gas in said tubular elements;
   flexible waterproof-skin material on the exterior of said group; said elements and waterproof-skin material being constructed and arranged to form a resilient, non-rigid buffer for said body, capable of substantial yielding under major shock without efficiency-destroying damage to said body;
   fluid-dynamic lift providing wing means fixed to the upper part of said body, comprising a set of gas-containing, strength-providing compartments and a skin over said compartments; and
   located at each outer end of said wing means, a wing-bracing means having upper and lower portions, the upper portion being fixed to an outer end of said wing means and the lower portion being connected to said body, comprising another set of gas-containing, strength-providing compartments;
   at least some of said compartments containing receptacles of lighter-than-air gas.
6. Structure as set forth in claim 5, in which each of said compartments contains a plurality of receptacles of lighter-than-air gas.
7. Structure as set forth in claim 5, in which said upper portion of said wing-bracing means is substantially vertical.
8. Structure as set forth in claim 7, in which said lower portion of said wing-bracing means is connected to the bottom part of said upper portion and is a lower lift-providing wing means.
9. Structure as set forth in claim 5, in which each of said wing-bracing means is inclined upwardly and outwardly from said body to one of the ends of said wing means.
10. A vehicle as set forth in claim 5, which further comprises a third set of gas-containing, strength-providing compartments, located exteriorly of said side and top walls.
11. A device as set forth in claim 5, in which said gas-containing compartments are tubular elements of flexible, non-stretchable material, containing gas at a pressure above that of the atmosphere.
12. A device as set forth in claim 11, in which said material of the tubular elements is thin very ductile metal.
13. A vehicle comprising:
   a useful-load-confining structure having: a skin; and within said skin a plurality of inflatable tubular elements, constructed and arranged to provide strength in said structure and to form its main framework, comprising walls of flexible material, and inflated with compressed gas at a pressure substantially greater than that of the atmosphere;

aerodynamic wing structure comprising: a plurality of inflated, strength-providing, tubular members, constructed and arranged to provide an aerodynamic lifting force on said vehicle, each of said tubular members having one of its portions connected to said load-confining structure and other portions connected to an adjacent one of said tubular members; and lighter-than-air gas within said wing structure, exerting an aerostatic lift on the wing structure; and a balloon-like tube, connected to said load-confining structure, inflated with gas and housing containers of lighter-than-air gas, said balloon-like tube having a cross-sectional area that is at least several times as large as the cross-sectional area of any one of said tubular elements.

14. A device as set forth in claim 13, which further comprises means for propulsion of said vehicle, and in which said balloon-like tube is doughnut-shaped in cross sections transverse to the vehicle's fore-and-aft axis, with an opening from end to end, said propulsion means being fixed to said tube, within said opening.

15. A vehicle comprising:
a useful-load-confining structure having: a skin; and within said skin a plurality of inflatable tubular elements, constructed and arranged to provide strength in said structure and to form its main framework, comprising walls of flexible material, and inflated with compressed gas at a pressure substantially greater than that of the atmosphere;

aerodynamic wing structure comprising: a plurality of inflated, strength-providing, tubular members, constructed and arranged to provide an aerodynamic lifting force on said vehicle, each of said tubular members having one of its portions connected to said load-confining structure and other portions connected to an adjacent one of said tubular members; and lighter-than-air gas within said wing structure, exerting an aerostatic lift on the wing structure, said tubular members being in vertically aligned, horizontal pairs, extending transversely of the vehicle's fore-and-aft axis, said wing structure further comprising vertical, inflated, flexible tubes, each of which is bonded to the outer ends of one of said pairs of wing tubular members.

16. A vehicle comprising:
a group of at least two liquid-storing tanks on each side of the vertical plane thru the vehicle's longitudinal axis, with one tank of each group being forward of another tank; and means for pumping liquid from the group of tanks on one side of said vertical plane to the group on the other side of the plane, and from forward tanks on the two sides of said plane to after tanks on the said two sides, for balancing the vehicle.

an elongated body, having interior surfaces that inclose

17. A vehicle comprising:
a load-confining space, comprising: flexible walls capable of yielding under shock and substantially returning to their former configuration without efficiency-destroying damage to the walls, having a flexible outer skin and a pluarity of resilient, vehicle-strength-providing elements within said skin; and elongated stiffening means located interiorly of the resilient elements, within and spaced interiorly from said skin, for stiffening at least one of said surfaces against undesired bending due to flexing of said flexible skin and resilient elements, said stiffening means comprising at least part of a floor of said load-confining space, and wing means for exerting a fluid-dynamic lift on the vehicle comprising: a plurality of juxtaposed flexible wing-bracing tubes, having contacting sidewalls throughout their lengths, connected to said body; compressed gas in said tubes having pressure well above that of the atmosphere, stiffening the tubes against bending under minor shocks; and waterproof flexible material covering the tubes; said flexible tubes and covering material providing a resilient, shock-taking buffer and being constructed and arranged to form streamlined outer surfaces of said wings.

18. Structure as set forth in claim 17, in which said body further comprises at least one container of lighter-than-air gas within said walls and within said space.

19. Structure as set forth in claim 17, in which said stiffening means comprises a liquid-containing tank.

20. Structure as set forth in claim 17, in which said gas is lighter than air.

21. Structure as set forth in claim 17, in which said resilient elements comprise flexible tubes filled with gas at a pressure well above that of the atmosphere, sufficient to prevent their bending under minor shocks.

22. A vehicle comprising:
an elongated body, having interior surfaces that inclose a load-confining space, comprising flexible walls capable of yielding under shock and substantially returning to their former configuration without efficiency-destroying damage to the walls, having a flexible outer skin and a plurality of resilient, strength-providing elements within said skin;

wing means for exerting a fluid-dynamic lift on the vehicle comprising: a plurality of flexible, wing-bracing tubes, having contacting sidewalls throughout their lengths, connected to said body; compressed gas in said tubes having pressure well above that of the atmosphere, stiffening the tubes against bending under minor shocks; and waterproof flexible material covering the tubes; said flexible tubes and covering material forming a resilient, shock-taking buffer and being constructed and arranged to form streamlined outer surfaces of said wings; and means for supporting said vehicle when at rest comprising: a plurality of juxtaposed flexible tubes in contact with each other and connected with said body; flexible material covering said tubes; and compressed gas within the tubes.

23. Structure as set forth in claim 22, in which at least some of the tubes of said vehicle supporting means are upright.

24. Structure as set forth in claim 23, in which a group of said supporting-means tubes projects from each side of said body, within a streamlined portion of said covering material, said structure further comprising means connecting one of said groups to a group of said upright tubes at each side of said body.

25. Structure as set forth in claim 23, which further comprises a wheel rotatably supported by said connecting means on each side of said body.

26. A vehicle having wings comprising:
a plurality of substantially airtight tubular receptacles, having walls of flexible material, said tubular receptacles forming structural, strength-providing framework of the vehicle, at least some of the receptacles being constructed and arranged to provide a useful-load-carrying space, at least some of the receptacles being constructed and arranged to form strength-providing framework of said wings and the general outer shape of the wings;

lighter-than-air gas inflating each of said receptacles at a pressure substantially above that of the atmosphere at sea level;

means holding said receptacles together; and a balloon-like structure, in the upper portion of the vehicle, comprising a plurality of inflatable, tubular receptacles having flexible-material walls, lighter-than-air gas within said last-named receptacles, and means holding said receptacles together.

27. A vehicle, having a load-supporting body which has upper, lower and side walls for housing a useful load, a tapered streamlined after part, and a fore-and-aft axis that is longer than its maximum dimension in cross sections that are normal to said axis, and having a wing-shaped portion with at least one fluid-dynamic surface that contacts fluid traversed by the vehicle, said wing-shaped portion extending laterally on each side of said axis and being of shorter extent in a generally fore-and-aft direction than said body, in which:

said wing-shaped portion has: strength-providing skin means comprising fabric and waterproofing material; strength-providing framework, within said skin means, comprising a plurality of sealed, curved tubular elements, the major axes of which are transverse to the vertical plane thru said fore-and-aft axis; and gas under a pressure greater than that of the atmosphere within said tubular elements; and said load-supporting body has: skin means having an outer surface contacting fluid traversed by the vehicle, strength-providing framework within said last-named skin means, forming part of said walls, comprising numerous sealed, curved tubular elements, in number over eight, located above, below and on each side of said load, the major axes of said tubular elements of the body being transverse to the vertical planes thru the major axes of said tubular elements of the wing-shaped portion, at least some of the tubular elements of said body being constructed and arranged to conform with said streamlined after part of the body;

at least some of the tubular elements of said wing-shaped portion being constructed and arranged to bracingly hold between them some of the tubular elements of said body; and one of said skin means forming at least part of means firmly and strongly connecting said load-supporting body to said wing-shaped portion, restraining said body and wing-shaped portion from vehicle-damaging movement relative to each other.

28. A vehicle as set forth in claim 27, in which one of said skin means further comprises resilient, shock-absorbing foam plastic between some of said tubular elements and a fluid-engaging surface of the skin means.

29. A vehicle as set forth in claim 27, in which the skin means of said wingshaped portion further comprises resilient, shock-absorbing foam plastic between some of said tubular elements and an outer surface of said portion.

30. A vehicle as set forth in claim 27, in which the skin means of said load-supporting body comprises resilient, shock-absorbing foam plastic between a group of said tubular elements and an outer surface of said body.

31. A vehicle as set forth in claim 30, in which the tubular elements of said group are in a lower portion of the vehicle, are part of a device which supports the vehicle when it is at rest, and present stiffly resilient resistance to shock from outside the vehicle, in which said shock-absorbing foam plastic is in contact with at least lower portions of the tubular elements of said group, and in which said body portion further comprises means strongly connecting the tubular elements of said group with other portions of said body framework.

32. A vehicle as set forth in claim 27, in which said tubular elements have metal walls.

33. A vehicle as set forth in claim 27, in which the pressure of said gas is at least five pounds above that of the atmosphere.

34. A vehicle as set forth in claim 27, in which said gas is lighter than air.

35. A vehicular structure comprising a wheel-supporting wall, capable of resiliently yielding under major shock, having a stiffly resilient wheel-supporting part, a skin and resilient foam plastic between said skin and resilient part, and a wheel, said wheel comprising:

a plurality of doughnut-shaped, coaxial, inflatable, resilient tubes; a doughnut-shaped, inflatable, resilient tube, having a minor diameter, between its tube walls, that is larger than that of each of said coaxial tubes, located within and having its radially outer periphery in contact with radially inner peripheries of said coaxial tubes; and gas at a pressure well above that of the atmosphere within each of said tubes; and an axle bearing, connected to said stiffly resilient part, closely adjacent to and supported by the last-named tube.

36. A structure as set forth in claim 35, in which said wheel further comprises: an outer doughnut shaped, resilient tube having a minor diameter, between its tube walls, that is smaller than that of each of said coaxial tubes; and a flexible skin tightly enveloping all of said tubes; the outer periphery of said wheel and skin being substantially V-shaped in cross section.

37. A device as set forth in claim 1, in which said structure is part of a useful-load-supporting body and the pressure of said gas is at least five pounds above that of the atmosphere.

38. A vehicular structure, forming at least part of the wall of a vehicle, having a smooth outer surface adapted to contact and facilitate smooth flow over it of fluid that is traversed by said vehicle, comprising:

a plurality of sealed receptacles, comprising curved walls of dense material, providing substantial strength against disruption of said wall; and fluid, lighter in weight than said dense material, within said receptacles;

resilient means firmly connecting said receptacles, holding them together and connecting them to other portions of said wall, restraining relative movement among the receptacles and between them and said other portions; and cover means, forming said smooth outer surface, comprising shock-absorbing, resilient, foam plastic that has set into a substantially permanent but resilient form and is between said surface and said receptacles.

39. Structure as set forth in claim 38, in which said dense material comprises metal.

40. Structure as set forth in claim 38, in which said dense material comprises plastic.

41. Structure as set forth in claim 38, in which said receptacles comprise tubular elements, and in which said fluid comprises gas in at least some of said elements.

42. Structure as set forth in claim 41, in which said gas is under a pressure well above that of the atmosphere.

43. Structure a set forth in claim 38, in which said means connecting said receptacles is resilient plastic.

44. Structure as set forth in claim 38, in which said resilient means connecting said receptacles comprises gas-cell-containing foam plastic, between said receptacles and between them and an inner surface of said wall.

45. A light weight vehicular structure, comprising a compartment having walls, and further comprising:

an outer flexible skin;

lightweight, gas-cell-containing plastic within said skin, and on at least one of said walls;

within said plastic, a plurality of hermetically-sealed, vehicle-strengthening receptacles; and lighter-than-air gas in said receptacles.

46. Structure as set forth in claim 45, which further comprises gas-containing tubular members, said receptacle-containing plastic being supported by said tubular members.

47. A vehicle as set forth in claim 26, in which at least some of the tubular receptacles of said balloon-like structure are constructed and arranged to form a curved contour of at least the upper portion of the balloon-like structure, in which said structure has a hollow inner space, open from end to end, and in which said vehicle further comprises means to propel said vehicle, supported within said opening by said structure.

48. A device as set forth in claim 27, in which at least some of said elements of the load-supporting body are elongated flexible tubes, each of which has two widely separated closed ends, one of said ends being adjacent to the nose of the craft and the other adjacent to its stern, the cross section of said body at any transverse plane between its ends being of substantially rectangular outer configuration.

49. A device as set forth in claim 26, in which said balloon-like structure is within said load-carrying space.

50. A flexible aircraft structure comprising:
a plurality of inflatable, substantially airtight receptacles having walls of flexible material that is capable of repeatedly yielding under severe shock and returning to substantially their former configurations, said receptacles, when inflated, forming strength-providing framework for at least the major portion of said structure;
means for inflating said receptacles with compressed gas at a pressure greater than that of the atmosphere;
cavity-containing lighter-than-air units floatingly supported by at least some of the receptacles, at least portions of said last-named receptacles being located between said units and the exterior of said structure, each of said units having a maximum dimension that is a minor fraction of the maximum dimension of said aircraft structure, and having a casing of material that substantially bars the permeation of gas thru said casing, said units being constructed and arranged to move under shock relatively to each other and to said receptacles without damage to said casings; and
means holding said receptacles together.

51. A device as set forth in claim 50, in which the cavities in at least some of said units contain lighter-than-air gas.

52. A device as set forth in claim 51, in which most of said receptacles are separately inflated and have walls that comprise flexible plastic.

53. A device as set forth in claim 51, in which said receptacles are closed tubes of material that comprises plastic.

54. A device as set forth in claim 51, in which said receptacles are square in cross section.

55. A device as set forth in claim 51, in which said structure is a fuselage, and in which at least some of said receptacles are grouped to provide a useful-load-confining space within said framework.

56. A device as set forth in claim 51, in which said structure is a wing.

57. A device as set forth in claim 51, in which said structure is a balloon.

58. A device as set forth in claim 51, in which said lighter-than-air units have thin metal walls.

59. A device as set forth in claim 51, in which said flexible material comprises thin metal.

60. A device as set forth in claim 51, in which said units have walls comprising plastic.

61. A device as set forth in claim 51, in which said units have walls comprising glass.

62. A device as set forth in claim 51, in which said lighter-than-air gas is helium.

63. A device as set forth in claim 51, in which said lighter-than-air gas comprises hydrogen.

64. A device as set forth in claim 63, in which said units are within said compressed gas and said compressed gas inhibits combustion.

65. A device as set forth in claim 50, in which said units have walls that comprise hard material, surrounding their cavities, and contains vacuums.

66. A device as set forth in claim 51, in which said lighter-than-air gas has a pressure below that of the atmosphere at sea level and the material of said casings is sufficiently resistant to flexure to prevent their collapsing.

67. A device as set forth in claim 50, which further comprises buffers, in contact with at least some of said casings, comprising material which will yield more readily than the material of said casings.

68. A flexible vehicle comprising:
a light-weight assemblage of strength-providing, resilient members, capable of taking minor shocks without flexure and, under major shocks, of repeatedly yielding and returning to their former configurations without efficiency-destroying damage, comprising cavity-containing, inflatable, tubular elements, inflated with gas at a pressure substantially above that of the atmosphere at sea level, and having wall material that is substantially impermeable to gas;
at least some of said members being constructed and arranged to provide, within outer boundary lines of their group, a useful-load-confining space;
means exterior of said inflatable elements, but within the outer borders of said assemblage, to provide lifting force on said resilient members;
a wheel, supported by some of said resilient members; and
means connecting said wheel to said last-named resilient members, comprising a wheel mounting that permits pivotal movement of the wheel relatively to said resilient members, said vehicle further comprising means for pivoting said wheel.

69. A vehicle as set forth in claim 68, in which the material of said tubular elements is metal.

70. A lighter-than-air vehicular structure comprising:
a substantially airtight, closed-ended envelope of flexible material, having a tubular cavity that is circular in cross section;
envelope-inflating gas within said cavity that is heavier than hydrogen; and
thin-walled, substantially airtight receptacles, containing gas that is lighter in weight than said inflating gas, each of said receptacles having a maximum dimension that is less than the diameter of said cavity across its center.

71. A device as set forth in claim 70, in which said inflating gas inhibits combustion and said second-named gas comprises hydrogen.

72. A flexible light-weight vehicle comprising an elongated, useful-load-carrying body and aerodynamic wing means for exerting lifting forces on the body, said wing means comprising:
a wing group of at least four closely juxtaposed inflated tubular elements of flexible, non-stretchable material, curved in cross sections, bearing against each other throughout their lengths when inflated, attached to said body, said elements being arranged in tandem from the nose of the wing means to its trailing edge, and contacting each other only at their sides, each of said elements having a cross-sectional area different from that of each of the other elements, with at least the after three of said elements being of successively smaller cross-sectional area in a fore-to-aft direction, with the element of smallest cross-sectional area being located nearest the trailing-edge portions of said wing means;
flexible waterproof material covering said tubular elements, contacting each of them at its top and bottom; and
compressed gas at a pressure well above that of the atmosphere in each of said tubular elements,
whereby said inflated tubular elements form strength-providing, nonbreakable, resilient framework of said wing means.

73. Structure as set forth in claim 72, in which said wing means comprises upper and lower wings joined at their outer ends by vertical wing-bracing means which comprises a set of vertical inflated tubular elements of non-stretchable material, each of said vertical tubes being joined at its top and bottom to a pair of tubes of said wing group having the same cross-sectional area as that of their connecting vertical tube.

(References on following page)

References Cited

UNITED STATES PATENTS

| | | | |
|---|---|---|---|
| 1,667,002 | 4/1928 | Hall | 244—5 |
| 1,766,906 | 6/1930 | James | 244—5 |
| 2,382,817 | 8/1945 | Reiss | 244—5 |
| 3,106,373 | 10/1963 | Bain et al. | 244—117 |
| 3,229,935 | 1/1966 | Bellanca | 244—123 |
| 2,960,294 | 11/1960 | Johnston et al. | 244—135 |

FOREIGN PATENTS

| | | |
|---|---|---|
| 28,704 | 1911 | Great Britain. |
| 837,591 | 6/1960 | Great Britain. |

FERGUS S. MIDDLETON, *Primary Examiner.*

T. W. BUCKMAN, *Assistant Examiner.*